Sept. 18, 1945.   B. F. LANGER   2,385,005
STRAIN MEASURING SYSTEM
Filed Nov. 19, 1942   2 Sheets-Sheet 1
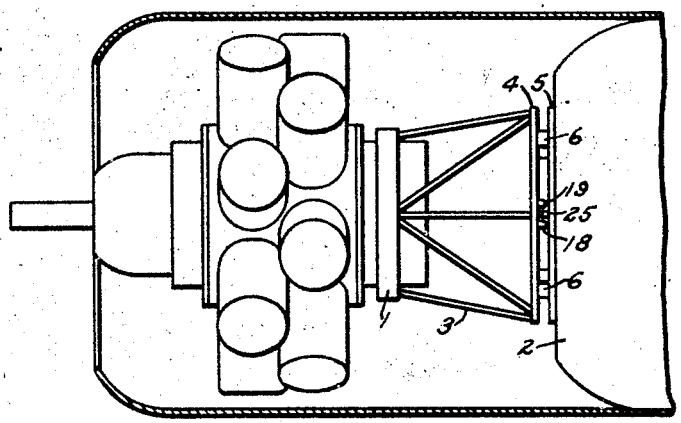
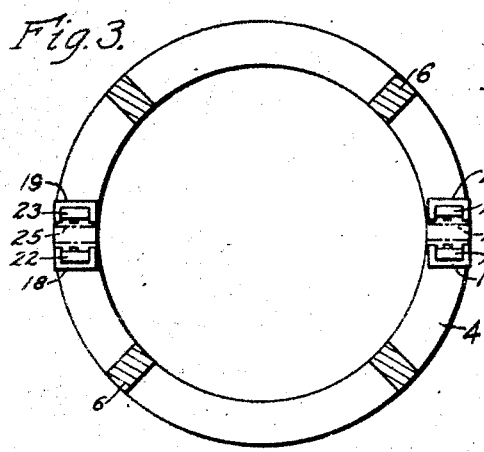
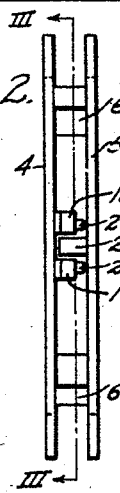
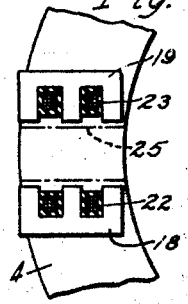
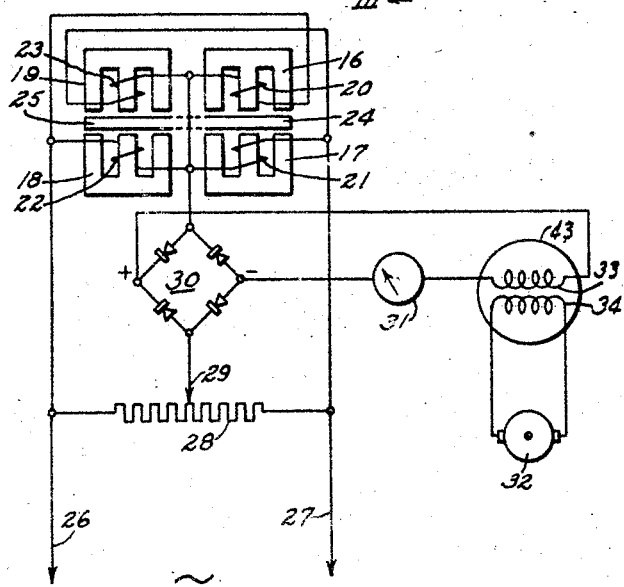
WITNESSES:   INVENTOR
Leon M. Garman   Bernard F. Langer.
E. F. Oberheim   BY
   Paul E. Friedemann
   ATTORNEY INVENTOR
*Bernard F. Langer.*
BY
*Paul E. Frickemann*
ATTORNEY Patented Sept. 18, 1945

2,385,005

UNITED STATES PATENT OFFICE 2,385,005

STRAIN MEASURING SYSTEM

Bernard F. Langer, Pittsburgh, Pa., assignor to Westinghouse Electric Corporation, East Pittsburgh, Pa., a corporation of Pennsylvania Application November 19, 1942, Serial No. 466,145

7 Claims. (Cl. 73—136)

The present invention relates, generally, to systems for continuously indicating or measuring the deflection of a member subject to a stress.

More particularly, the present invention relates to a system of the character mentioned which employs a magnetic type of strain gauge to produce a voltage or a change of voltage which is indicative of the deflection being measured, the strain gauge in most applications being secured to the member being deflected so that the strain gauge elements may be subjected to movements equivalent to the deflections of the member.

The deflection or strain measuring system as hereinafter described and illustrated in the drawings is specifically adapted for measuring the torsional deflections or strain of a stationary member which is subjected to the torque output of a prime mover, for the purpose of indicating the torque output of the prime mover. It should not be construed, however, that the invention is limited to this application alone since this same type of strain gauge may be used to measure the deflection or strain of a member subject either to tension or compression loading. Thus by proper positioning of a magnetic strain gauge, it will be seen that the thrust of a prime mover may be conveniently measured in a supporting structure of the character hereinafter described.

In the past, in some shaft installations, torque measuring systems, in which the magnetic strain gauges were mounted directly on the shaft have been used. In many cases, however, sufficient space for such strain gauge mountings is not obtainable. Furthermore, the coil elements which are relatively weak mechanically are subjected to high centrifugal forces which may damage the coils and thus very materially impair the operation of the system. In addition, because of the rotating coil structure, it is necessary to supply the electrical energy to the coils through the medium of slip rings on the shaft and brushes. Since the electrical quantities to be measured are relatively small, the varying electrical characteristics of the slip ring and brush assemblies often introduce relatively large errors into the measuring system and thus cause inaccurate indications of the torque being transmitted by the shaft.

It is, therefore, a principal object of the present invention to provide a mechanical power measuring system in which the electric extensometers or magnetic strain gauges are stationarily positioned.

More specifically, it is a principal object of the present invention to provide a torque or horsepower measuring system in which the magnetic strain gauge elements are positioned to measure the torsional deflection of a stationary member subject to the torque application of a prime mover.

Another object of the present invention is to provide a deflection or strain measuring system which shall compensate for voltage fluctuation of the source of applied potential.

Other objects and advantages will become more apparent from a study of the following specification when considered in conjunction with the accompanying drawings, in which:

Figure 1 is a side elevational view of an aircraft engine mounting embodying the principles of this invention;

Fig. 2 is an enlarged view of a portion of engine mounting illustrated in Fig. 1;

Fig. 3 is a sectional view taken on the line III—III of Fig. 2;

Fig. 4 is an enlarged view of the strain gauge mounting illustrated in Fig. 3;

Figure 6:
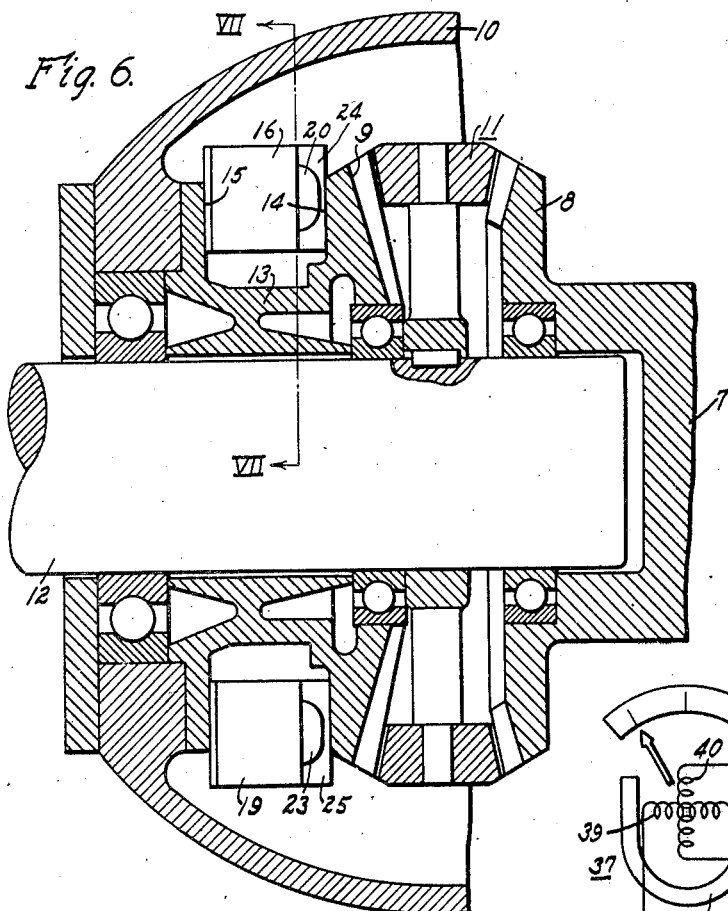
Figure 7:
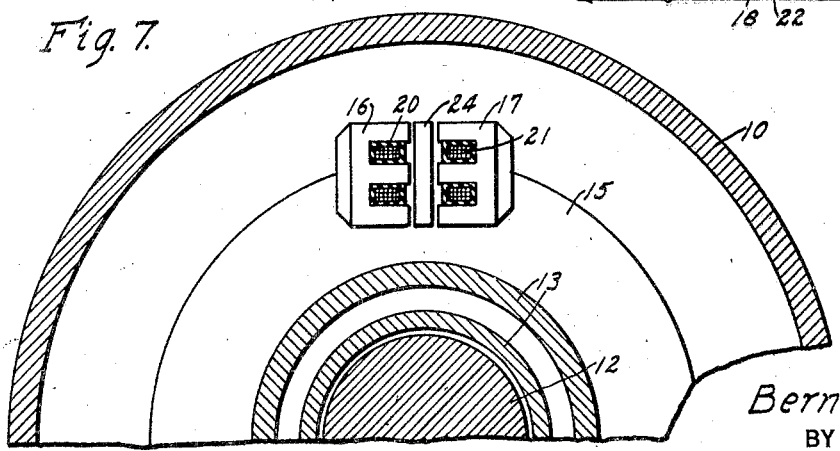

Fig. 5 schematically illustrates the magnetic strain gauges shown in Fig. 1 to Fig. 4, as embodied in a circuit for measuring torque and horsepower;

Fig. 6 is a sectional view of a form of gear reduction unit in an aircraft engine showing a stationary magnetic strain gauge assembly for measuring torque in accordance with the principles of this invention;

Fig. 7 is a sectional view taken on the line VII—VII of Fig. 6; and

Figure 8:
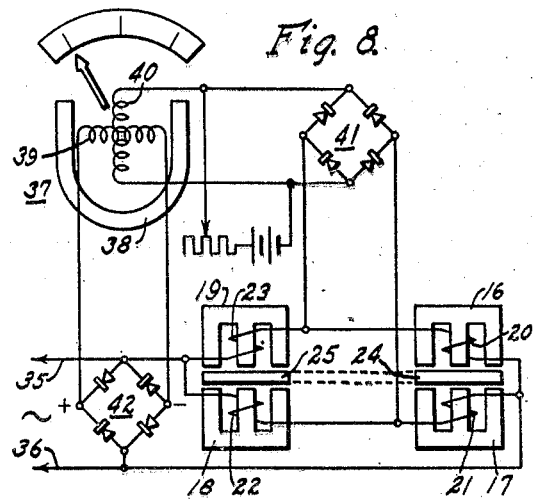

Fig. 8 diagrammatically illustrates a torque measuring system embodying the principles of this invention.

Referring now to the drawings, there is illustrated in Fig. 1 a typical structure used for mounting a radial aircraft engine to the fuselage, or nacelle if the engine is wing mounted, of an airplane. The standard mounting for engines of this type ordinarily comprises a ring 1 to which the engine is bolted which ring is in turn attached to the firewall 2 on the airplane structure by means of a framework 3 which is made from tubes. In many installations these tubes are bolted directly or through rubber bushings to the firewall. In practicing the present invention, however, the above-described construction is modified to include a pair of axially spaced rings 4 and 5 which are rigidly interconnected by means of the spacing members 6 which serve to provide a predetermined axial disposition of the rings (see Figs. 2 and 3). As illustrated, the ring 5 is secured to the firewall of the airplane and the ring 4 has securely fastened thereto the tube members of the engine mounting framework 3. It will now readily be noted that upon a torque output of the engine a counter force or torque equal in value to the torque value of the engine output is applied to the engine mounting and transmitted to the ring 4 by the tubular framework 3 and thence through the spacers 6 to the ring 5 and the airplane structure. The forces thus transmitted will cause a deflection of the spacing members 6 of sufficient amount to allow a slight relative angular displacement of the ring 4 with respect to the ring 5. The angular displacement of the ring member thus obtained is a measure of the counter torque which is proportional to the torque output of the engine and the amount of the angular displacement of the rings is, therefore, an indication or measurement of the value of the torque output.

In Figs. 6 and 7 of the drawings, there is illustrated a positioning of magnetic strain gauges to measure the torsional deflections of a sun gear in a planetary gear reduction unit included as a part of an aircraft engine. The fundamental principles utilized in this application are the same as those embodied in the application illustrated in Fig. 1.

As shown in Fig. 6, the output or drive shaft 7 of the engine terminates in a bevel gear construction 8 which forms one element of a planetary reduction gear assembly, a second gear 9 is stationarily supported coaxially with respect to the first gear within a housing 10 which is stationarily secured to the front of the engine (not shown). Disposed between and in mesh with both gears 8 and 9 is a planetary gear cage 11 which is secured to a shaft 12 coaxially mounted with respect to the drive shaft 7 and which is the shaft normally connected to the propeller or other load to be driven.

Assuming now that the drive shaft 7 is rotated and a load is applied to the output shaft 12, it will be seen that the gear 9 will be loaded in torsion in an amount proportional to the engine torque which torsional load is transmitted therethrough to the stationary housing 10. Thus, similar to the application illustrated in Fig. 1, a deflection of the axial section 13 interconnecting the transverse faces 14 and 15 of the sun gear 9 will occur, allowing relative angular displacement of the face 14 with respect to the face 15 and in like manner the amount of the angular displacement of the rings is an indication or measurement of the value of the torque output.

The mechanical movements thus obtained are utilized by means of suitable electromagnetic means or other electric extensometers responsive to slight mechanical movements to produce a voltage or a change of voltage which is indicative of the torque output of the engine and which by means of a suitably calibrated meter may be read directly in terms of torque.

The specific strain gauge illustrated in the drawings is of well known construction and comprises a pair of E-shaped core members having wound about the central leg of each thereof a coil. The core members are positioned in confronting relation. An armature disposed between the extremities of the legs of the core member completes a magnetic flux path through which an alternating magnetic flux linked with each of the coils may circulate upon energization of the coils from a suitable source of alternating potential. The impedance of each of the coils may be varied by slight movement of the armature transversely of the air gap between the core members which changes the reluctance of the flux paths and the density of the magnetic fluxes circulating therein to increase the impedance of one coil while decreasing the impedance of the other coil.

The preferred arrangement of the magnetic strain gauges on the ring elements 4 and 5 is illustrated in Figs. 2, 3 and 4. The two magnetic strain gauges are so mounted in diametrically opposite relation on the rings 4 and 5 as to accurately measure the relative motion between them. Laminated iron cores 16, 17, 18 and 19 of generally E-shape have wound about each central leg thereof magnetizing coils 20, 21, 22 and 23. Centrally disposed between the confronting laminated core extremities and non-magnetically secured to the ring 5 are armature members 24 and 25. Thus when relative angular motion takes place between the rings 4 and 5, the air gaps associated with one pair of diametrically opposite coils will increase while the air gaps associated with the other pair of diametrically opposite coils will decrease, depending upon the direction of the applied torque, to correspondingly change the values of the impedances of the coils.

By the use of four coils mounted as shown, automatic compensation for any relative translational motion of the rings is obtained so that if the ring 4 were to move down with respect to the ring 5 (see Figs. 2 and 3) the two upper air gaps would be decreased while the two lower air gaps would be increased in a corresponding amount.

It is apparent, therefore, by proper grouping of the coils, automatic compensation is obtained. By properly associating coil 20 with coil 22 in one leg of a bridge circuit and by associating coils 21 and 23 in another leg of the bridge circuit, there is thus in each pair of associated coils, upon downward movement of ring 4 with respect to ring 5, one with an increased air gap and one with a decreased air gap and therefore, there is in each pair of associated coils one coil with decreased impedance and one coil with increased impedance so that the bridge circuit remains balanced insofar as relative translational motion of the rings is concerned. The associated coils may be connected in either suitable series or parallel circuit relation, the parallel circuit arrangement being illustrated in Fig. 5. From the foregoing it is obvious that any number of strain gauges greater than one equally spaced around the circumference may be used to compensate for the translational motion of the rings.

The mechanical arrangement of the strain gauges illustrated in Figs. 6 and 7 is similar to that shown in Figs. 1 through 4 and considerations as to the operation of the gauges in their diametrically opposite positions are analogous to those with reference to Figs. 1 through 4. Since the strain gauges are identical in structure, like reference numerals have been assigned to like parts.

In Fig. 5, a suitable source of alternating potential is indicated by the circuits 26 and 27. As shown, the alternating potential is applied across the input terminals of a bridge circuit which comprises as one leg the paralleled coils 20 and 22, as another leg the paralleled coils 21 and 23 and as each of the other legs half of the potentiometer 28 as indicated by the position of the potentiometer slider 29, the slider being provided to balance the bridge circuit. The output terminals of the bridge circuit are connected to the input terminals of a bridge rectifier 30 the output or positive and negative terminals of which are connected across an indicating instrument 31 which may be provided with a scale readable in terms of torque.

Assuming now that a torque output of the engine causes rotation of the ring 4 with respect to the ring 5 in such a direction as to cause counterclockwise armature movement with respect to the core members as viewed in Fig. 5, it will be seen that the air gaps associated with the coils 20 and 22 will be decreased while the air gaps associated with the coils 21 and 23 will be increased to cause a corresponding increase of impedance in one pair of associated coils while causing a decrease of impedance in the other pair of associated coils thus causing the bridge to be thrown out of balance. As a result of this unbalance a voltage difference appears across the output terminals of the bridge circuit and a voltage proportional to this voltage difference or unbalance of the bridge circuit is impressed across the terminals of the indicating instrument 31 which as previously described will produce an indication readable in terms of torque.

In some cases it may be desirable to provide an indication of the actual horsepower output of an engine. Since the horsepower of an engine is indicated by the product of the torque and the speed and the torque sense is already provided as previously described, it is only necessary to provide a means for producing a voltage proportional to the speed. To accomplish this end, as shown in Fig. 5, a direct current tachometer generator 32 is provided. This generator is driven at some speed proportional to the speed of the engine shaft and therefore produces a voltage proportional to the shaft speed.

An indicating instrument having two internal circuits providing an indication corresponding to the multiplied effects produced by the currents in its internal circuits is indicated at 43. It comprises a movable coil 33 in flux linkage with a stationary coil 34. The voltage supplied by the generator is applied across the stationary coil 34 and the output of the bridge circuit supplies the movable coil 33. Thus if the shaft is rotating at no load, the voltage coil alone will be energized and a zero reading on the meter will result. Upon the transmission of torque, however, and a corresponding bridge unbalance a voltage proportional to the torque is impressed across the moving coil and the products of the effects produced by the currents in the instrument coils will cause a meter deflection proportional to the horsepower being developed by the engine.

A modification of the circuit of Fig. 5 is provided in Fig. 8. In this circuit arrangement the coils 20, 21, 22 and 23 of the strain gauge are in such circuit arrangement that each coil forms one leg of the conventional bridge circuit. A suitable source of alternating potential is applied across the input terminals of the bridge circuit by means of conductors 35 and 36.

The indicating instrument 37 is preferably of the cross coil type and is illustrated diagrammatically. It comprises a stationary permanent magnet 38 and a movable armature positioned to be influenced by the field of the permanent magnet. The armature of the instrument includes a pair of coils 39 and 40 mounted at an angle with respect to each other; the arrangement being such that both coils control the movement of the pointer to provide an indication corresponding to the opposed effects produced by the currents in the coils.

Interconnecting the coil 40 of the indicating instrument with the output terminals of the bridge circuit is a circuit comprising a bridge rectifier 41 having its input terminals connected across the output terminals of the bridge circuit and its output or positive and negative terminals connected across the coil 40 of the indicating instrument. The second coil 39 is connected across the source of alternating potential by a circuit including a bridge rectifier 42 having its input terminals connected across the conductors 35 and 36 and thus the source of alternating potential, and its output or positive and negative terminals connected across the coil 39 of the indicating instrument. The circuit arrangement disclosed may require some special means for adjusting the zero position of the indication instrument. This is accomplished by means of a small biasing battery and a rheostat which provides small adjustable direct current bias across coil 40.

It will be noted upon an inspection of Fig. 8 that both coils 39 and 40 of the indicating instrument are subject to voltage applications from the source of alternating potential. Since, as previously mentioned, the instrument provides an indication corresponding to the opposed effects produced by the currents circulating in the instrument coils, variations in the source of alternating potential will equally affect both coils of the instrument due to the circuit arrangement, and as a consequence thereof produce no change of indication as would be the case were only one of the coils affected. Thus the only indication provided by the indicating instrument is that of the quantity to be measured.

The operation of the torque measuring system of Fig. 8 is as follows: Assume a torque output of the engine of such direction which will rotate the diametrically opposite armature member 24 and 25 in a counterclockwise direction as viewed in this figure. It will be seen that the air gaps associated with the coils 20 and 22 will be decreased while the air gaps associated with the coils 21 and 23 will be increased. Thus one pair of opposite legs of the bridge circuit will include coils having increased impedance while the other pair of opposite legs will include coils having decreased impedance to thus cause an unbalance of the bridge proportional to the armature movement which is proportional to the torque output of the engine. This unbalanced voltage is impressed across the coil 40 of the indicating instrument.

The coil 39 produces a flux component proportional to the applied alternating potential and the coil 40 produces a flux component proportional to the unbalanced voltage existing across the output terminals of the bridge circuit. The resultant of these two flux components causes the armature or crossed coil assembly of the instrument to rotate to a position in which the resultant lines up with the magnetic field produced by the permanent magnet. Since both flux components depend upon the source of alternating potential, the effect of variation of the source of alternating potential is eliminated, since the flux resultant with respect to the instrument armature depends only upon the relative magnitudes of the flux components. The deflection of the pointer of the indicating instrument is, therefore, in view of the compensation for the variations in the source of alternating potential entirely dependent upon the degree of unbalance of the bridge circuit which unbalance being proportional to the torque output of the engines provides an indication accurately indicative of the engine torque.

The foregoing disclosure and the showings made in the drawings are merely illustrative of the principles of this invention and are not to be interpreted in a limiting sense. The only limitations are to be determined from the scope of the appended claims.

I claim as my invention:

1. A system for measuring the torque output of a prime mover comprising, in combination, a member having substantially rigidly joined axially displaced sections, one of said sections being stationarily secured and the other of said sections being movable through a small angle relative to the stationary section, means interconnecting said member and said prime mover whereby said movable section has applied thereto a torque loading proportional to the torque output of said prime mover, an element of a magnetic strain gauge mounted on one of said sections of said member, another element of said strain gauge mounted in magnetically cooperating relation only with said first strain gauge element on the other section of said member means for producing a voltage varying in magnitude with changes in relation of the two elements of said magnetic strain gauge upon a torque output of said prime mover, and means for measuring the voltage whereby the torque output of said prime mover is indicated.

2. A system for measuring the torque output of a prime mover comprising, in combination, a member having a pair of substantially rigidly joined axially displaced sections, one of said sections being stationarily secured and the other of said sections being movable through a small angle relative to the stationary section means interconnecting said member with said prime mover whereby said member is subject to the torque output of said prime mover, at least one electromagnetic element mounted on one of said axially displaced sections of said member, a magnetic element mounted in magnetically cooperating relation only with said electromagnetic element on the other axially displaced section of said member, means for producing a voltage varying in magnitude with changes in relation of the electromagnetic and magnetic elements due to relative angular displacement of said axially displaced sections upon a torque output of said prime mover, and means for measuring the voltage whereby the torque output of said prime mover is indicated.

3. A system for measuring the torque output of a prime mover comprising, in combination, a member having a pair of substantially rigidly joined axially displaced transverse faces, one of said faces being stationarily secured and the other of said faces being movable through a slight angle relative to the stationary face means interconnecting said member and said prime mover whereby said movable section has applied thereto a torque loading proportional to the torque output of said prime mover, a magnetic strain gauge having an element thereof supported on one of said transverse faces and the other element thereof supported in magnetically cooperating relation only with said first element on the other of said transverse faces, a second magnetic strain gauge diametrically oppositely disposed with respect to said first mentioned strain gauge having one element thereof supported on one of said transverse faces and the other element thereof supported in cooperating relation to said first element on the other of said transverse faces, means for producing a voltage varying in magnitude with changes in relation of the cooperating elements of each of said magnetic strain gauges upon relative angular displacement of said transverse faces due to a torque output of said prime mover, and means for measuring the voltage whereby the torque output of said prime mover is indicated.

4. A system for measuring the torque output of a prime mover comprising, in combination, a member having a pair of substantially rigidly joined axially displaced transverse faces, one of said faces being stationarily secured and the other of said faces being movable through a slight angle relative to the stationary face, means interconnecting said member and said prime mover whereby said transverse faces are relatively angularly displaced when said member is subject to the torque output of said prime mover, a magnetic strain gauge comprising a pair of coil and core assemblies in confronting relation and an armature member disposed for slight relative movement therebetween, said armature member being supported on one of said transverse faces and said coil and core assembly being supported on the other of said transverse faces, a second magnetic strain gauge comprising a pair of coil and core assemblies in confronting relation and an armature member disposed for slight relative movement therebetween, said second magnetic strain gauge being diametrically oppositely disposed with respect to said first mentioned magnetic strain gauge having its armature member supported on one of said transverse faces and its coil and core assembly supported on the other of said transverse faces, means for producing a voltage varying in magnitude with the changes in relation of the cooperating elements of each of the magnetic strain gauges upon relative angular displacement of said transverse faces due to a torque output of said prime mover, and means for measuring the voltage whereby the torque output of said prime mover is indicated.

5. A system for measuring the torque output of a prime mover comprising, in combination, a member having a pair of substantially rigidly joined axially displaced transverse faces, one of said faces being stationarily secured and the other of said faces being movable through a small angle relative to the stationary face, means interconnecting said member and said prime mover whereby said movable transverse face is displaced angularly relative to said stationary transverse face when said member is subject to the torque output of said prime mover, a magnetic strain gauge comprising a pair of coil and core assemblies in confronting relation and an armature member disposed for slight relative movement therebetween, said armature member being supported on one of said transverse faces and said coil and core assembly being supported on the other of said transverse faces, a second magnetic strain gauge comprising a pair of coil and core assemblies in confronting relation and an armature member disposed for slight relative movement therebetween, said second magnetic strain gauge being diametrically oppositely disposed with respect to said first mentioned magnetic strain gauge having its armature member supported on one of said transverse faces and its coil and core assembly supported on the other of said transverse faces, a source of alternating potential for energizing said coils, an indicating instrument, circuit means including bridge rectifier means interconnecting said coils of said magnetic strain gauges with said indicating instrument whereby said indicating instrument has applied thereacross a voltage corresponding to a change in voltage of said coils upon movement of said armature members relative to said core members when said stationary member is subject to torque.

6. A system for measuring the torque output of a prime mover comprising, in combination, a member having a pair of substantially rigidly joined axially displaced transverse faces, one of said faces being stationarily secured and the other of said faces being movable through a small angle relative to the stationary face, means interconnecting said member and said prime mover whereby said movable transverse face is displaced angularly relative to said stationary face when said member is subject to the torque output of said prime mover, a magnetic strain gauge comprising a pair of coil and core assemblies in confronting relation and an armature member disposed for slight relative movement therebetween, said armature member being supported on one of said transverse faces and said coil and core assembly being supported on the other of said transverse faces, a second magnetic strain gauge comprising a pair of coil and core assemblies in confronting relation and an armature member disposed for slight relative movement therebetween, said second magnetic strain gauge being diametrically oppositely disposed with respect to said first-mentioned magnetic strain gauge and having its armature member supported on one of said transverse faces and its coil and core assembly supported on the other of said transverse faces whereby relative angular displacement of said transverse faces will so move said armature members relative to said core members as to cause an increase in a voltage in one pair of diametrically opposite coils while causing a decrease in a voltage in the other pair of diametrically opposite coils, circuit means whereby said coils are connected each to form one leg of a bridge circuit having input and output terminals, the diametrically opposite coils being positioned in opposite legs of said bridge circuit, a source of alternating potential for energizing said bridge circuit, a meter comprising a first and a second internal circuit providing an indication corresponding to the opposed effects produced by the currents in said internal circuits, a first circuit including a bridge rectifier interconnecting said first internal circuit of said meter with the output terminals of said bridge circuit, and a second circuit including a bridge rectifier interconnecting said second internal circuit of said meter with said source of alternating potential.

7. Apparatus of the character referred to in claim 6 and in addition means for providing a direct current bias on said first-mentioned internal circuit of said meter whereby a zero indication of said meter is obtained.

BERNARD F. LANGER.